(12) United States Patent
Ishiwata et al.

(10) Patent No.: US 10,088,910 B2
(45) Date of Patent: Oct. 2, 2018

(54) INFORMATION PROCESSING APPARATUS AND INFORMATION PROCESSING METHOD

(71) Applicant: SONY CORPORATION, Tokyo (JP)

(72) Inventors: Katsutoshi Ishiwata, Kanagawa (JP); Satoshi Suzuki, Kanagawa (JP); Naoya Okamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 44 days.

(21) Appl. No.: 15/115,311

(22) PCT Filed: Nov. 28, 2014

(86) PCT No.: PCT/JP2014/081561
§ 371 (c)(1),
(2) Date: Jul. 29, 2016

(87) PCT Pub. No.: WO2015/118756
PCT Pub. Date: Aug. 13, 2015

(65) Prior Publication Data
US 2017/0003752 A1 Jan. 5, 2017

(30) Foreign Application Priority Data

Feb. 10, 2014 (JP) ................. 2014-023348

(51) Int. Cl.
| | |
|---|---|
| *G09G 5/00* | (2006.01) |
| *G06F 3/01* | (2006.01) |
| *G06F 3/03* | (2006.01) |
| *G06T 7/73* | (2017.01) |

(52) U.S. Cl.
CPC ............ *G06F 3/017* (2013.01); *G06F 3/0304* (2013.01); *G06T 7/73* (2017.01); *G06T 2207/10021* (2013.01); *G06T 2207/30196* (2013.01)

(58) Field of Classification Search
CPC .......... G06F 3/017; G06F 7/73; G06F 3/0304; G06F 2207/10021; G06F 2207/30196
USPC ........................................................ 345/156
See application file for complete search history.

(56) References Cited

U.S. PATENT DOCUMENTS

| | | | | |
|---|---|---|---|---|
| 2010/0306261 A1* | 12/2010 | Geisner | ................... | G06F 3/011 707/776 |
| 2012/0133585 A1* | 5/2012 | Han | ........................ | G06F 3/017 345/158 |
| 2015/0206023 A1* | 7/2015 | Kochi | .................... | G01B 11/00 382/199 |

FOREIGN PATENT DOCUMENTS

| | | |
|---|---|---|
| JP | 08-328735 A | 12/1996 |
| JP | HEI 08-328735 A | 12/1996 |
| JP | 2004-246856 A | 9/2004 |
| JP | 2012-003723 A | 1/2012 |
| JP | 2013-205983 A | 10/2012 |

(Continued)

*Primary Examiner* — Insa Sadio
(74) *Attorney, Agent, or Firm* — Chip Law Group

(57) ABSTRACT

Provided is an information processing apparatus including: a point cloud generation unit configured to generate a point cloud from a range image representing a range equivalent to a distance from a display screen to an object; and a position determination unit configured to perform a principal component analysis on the generated point cloud, to detect a vector corresponding to an object relating to position specification based on an analysis result obtained by the analysis, and to determine a specified position, the specified position being specified on the display screen.

14 Claims, 10 Drawing Sheets

(56) References Cited

FOREIGN PATENT DOCUMENTS

JP      2013-205983 A    10/2013

* cited by examiner

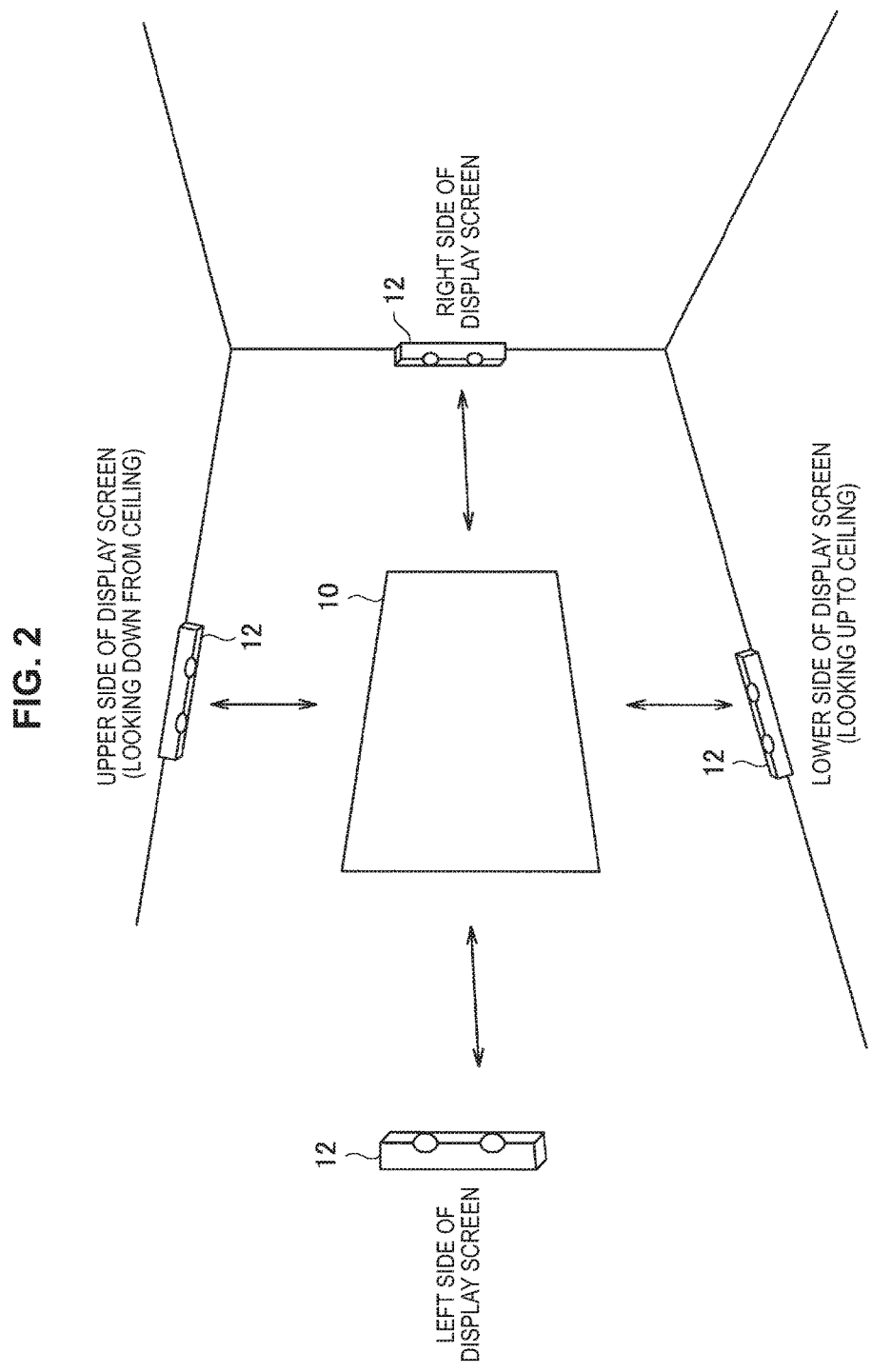

FIG. 3

| NUMBER OF SENSORS | POSITION OF SENSOR |
|---|---|
| 2 | UPPER SIDE OF DISPLAY SCREEN<br>LEFT SIDE OF DISPLAY SCREEN |
| 2 | UPPER SIDE OF DISPLAY SCREEN<br>RIGHT SIDE OF DISPLAY SCREEN |
| 2 | LOWER SIDE OF DISPLAY SCREEN<br>LEFT SIDE OF DISPLAY SCREEN |
| 2 | LOWER SIDE OF DISPLAY SCREEN<br>RIGHT SIDE OF DISPLAY SCREEN |
| 3 | UPPER SIDE OF DISPLAY SCREEN<br>LEFT SIDE OF DISPLAY SCREEN<br>RIGHT SIDE OF DISPLAY SCREEN |
| 3 | LOWER SIDE OF DISPLAY SCREEN<br>LEFT SIDE OF DISPLAY SCREEN<br>RIGHT SIDE OF DISPLAY SCREEN |
| 4 | FOUR DIRECTIONS |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2014/081561 filed on Nov. 28, 2014, which claims priority benefit of Japanese Patent Application No. 2014-023348 filed in the Japan Patent Office on Feb. 10, 2014. Each of the above-referenced applications is hereby incorporated herein by reference in its entirety.

TECHNICAL FIELD

The present disclosure relates to an information processing apparatus, an information processing method, and a program.

BACKGROUND ART

In recent years, as one example, the techniques for operations of equipment based on an operator's gesture have been developed. Examples of the techniques for operations of equipment based on the operator's gesture include the technique disclosed in Patent Literature 1 below.

CITATION LIST

Patent Literature

Patent Literature 1: JP 2013-205983A

SUMMARY OF INVENTION

Technical Problem

In the technique disclosed in Patent Literature 1 as one example, the hand gesture of the operator is recognized based on a learned three-dimensional model data of a human body. Thus, the use of the technique disclosed in Patent Literature 1 as one example may make it possible to perform an operation of specifying a position on a display screen by the operator's gesture (sometimes referred to as "pointing operation" hereinafter).

However, the gesture recognition performed using a learned three-dimensional model data of a human body is not necessarily to perform the user's desired pointing operation stably due to the accuracy of machine learning or the like.

An embodiment of the present disclosure provides a novel and improved information processing apparatus, information processing method, and program, capable of determining a specified position on a display screen based on a range image.

Solution to Problem

According to the present disclosure, there is provided an information processing apparatus including: a point cloud generation unit configured to generate a point cloud from a range image representing a range equivalent to a distance from a display screen to an object; and a position determination unit configured to perform a principal component analysis on the generated point cloud, to detect a vector corresponding to an object relating to position specification based on an analysis result obtained by the analysis, and to determine a specified position, the specified position being specified on the display screen.

According to the present disclosure, there is provided an information processing method executed by an information processing apparatus, the information processing method including: a step of generating a point cloud from a range image representing a range equivalent to a distance from a display screen to an object; and a step of performing a principal component analysis on the generated point cloud, detecting a vector corresponding to an object relating to position specification based on an analysis result obtained by the analysis, and determining a specified position, the specified position being specified on the display screen.

According to the present disclosure, there is provided a program for causing a computer to execute: a step of generating a point cloud from a range image representing a range equivalent to a distance from a display screen to an object; and a step of performing a principal component analysis on the generated point cloud, detecting a vector corresponding to an object relating to position specification based on an analysis result obtained by the analysis, and determining a specified position, the specified position being specified on the display screen.

Advantageous Effects of Invention

According to the embodiments of the present disclosure, it is possible to determine a specified position on a display screen based on a range image.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 2 is a diagram illustrated to describe an example of a process for implementing an information processing method according to an embodiment of the present disclosure.

FIG. 3 is a diagram illustrated to describe an example of a process for implementing an information processing method according to an embodiment of the present disclosure.

DESCRIPTION OF EMBODIMENT(S)

Figure 1:
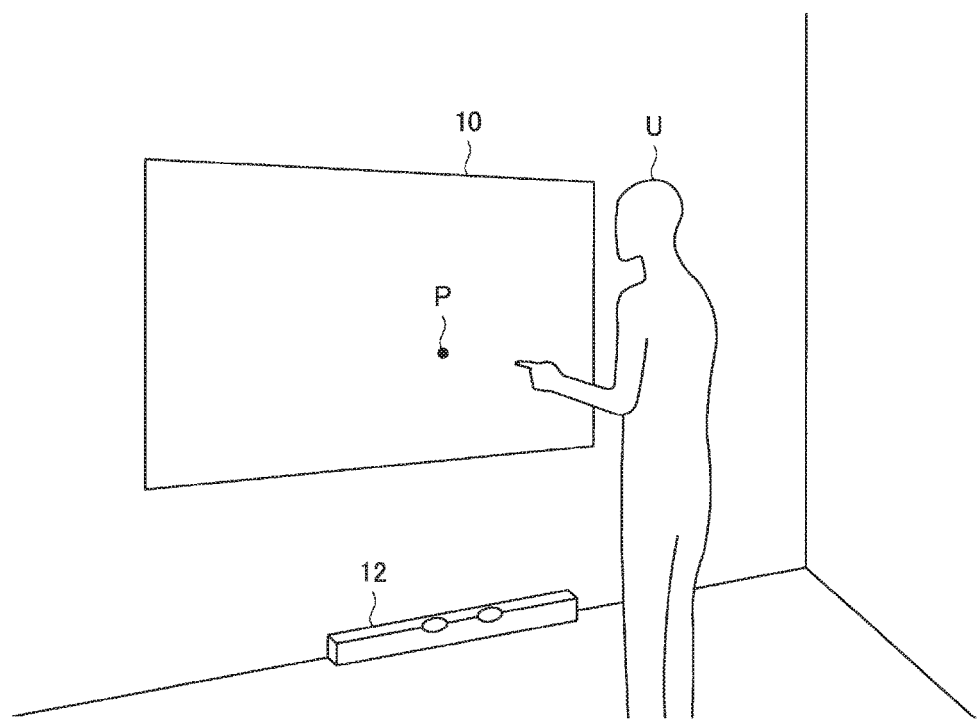
FIG. 1 is a diagram illustrated to describe an example of a process for implementing an information processing method according to an embodiment of the present disclosure.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will be given in the following order.
1. Information Processing Method according to Embodiment
2. Information Processing Apparatus according to Embodiment
3. Program according to Embodiment
(Information Processing Method According to Embodiment of Present Disclosure)

An information processing method according to the present embodiment will be described, and then the configuration of an information processing apparatus according to the present embodiment will be described. The information processing method according to the present embodiment will be described by taking the case in which the information processing apparatus according to the present embodiment performs a process of implementing the information processing method according to the present embodiment as one example.

[1] Overview of Process for Implementing Information Processing Method According to Present Embodiment The information processing apparatus according to the present embodiment determines a position on a display screen specified with respect to the display screen (referred to as "specified position" hereinafter), for example based on a range image representing a range equivalent to the distance from the display screen to an object.

The range image according to the present embodiment is generated, for example based on a stereoscopic image generated by image capturing in the direction opposite to the display screen from the display screen side. The stereoscopic image according to the present embodiment is two captured images that are captured by an imaging device, for example by shifting an image capturing position in parallel. The two captured images, which constitute the stereoscopic image according to the present embodiment, are a right-eye image corresponding to the right eye of a user and a left-eye image corresponding to the left eye of the user in the case of implementing stereoscopic vision. The range image according to the present embodiment is generated using any technique capable of generating a range image from a stereoscopic image, for example such as a method using the principle of triangulation. The imaging device used in the generation of a stereoscopic image is arranged, for example so that the image capturing may be performed in the direction opposite to the display screen from the display screen side.

The range image according to the present embodiment is not limited to the range image generated based on the stereoscopic image. As one example, the range image according to the present embodiment may be an image generated using any technique capable of generating a range image, for example such as time-of-flight (ToF) technique and structured-light technique. As one example, a range image sensor used to generate a range image by a ToF technique or the like is arranged to generate a range image corresponding to the direction opposite to the display screen from the display screen side.

A process for generation of the range image according to the present embodiment is generated, for example by a range image sensor included in the information processing apparatus according to the present embodiment or an external range image sensor that can communicate with the information processing apparatus according to the present embodiment via wired or wireless connection. Examples of the range image sensor according to the present embodiment include a passive depth sensor (a depth sensor used to generate a range image by parallax of the stereoscopic image) and an active depth sensor (e.g., a ToF-based depth sensor and a structured light-based depth sensor).

The process for generation of the range image according to the present embodiment according to the present embodiment is not limited to the process performed by the range image sensor. As one example, when the range image is generated from the stereoscopic image, the information processing apparatus according to the present embodiment is also capable of generating the range image from a stereoscopic image generated by an imaging device included in the information processing apparatus according to the present embodiment or by an external imaging device capable of communicating with the information processing apparatus according to the present embodiment via wired or wireless connection.

In this description, strictly speaking, the distance to an object, which is indicated by the range image according to the present embodiment, corresponds to the distance from the range image sensor to the object or the distance from the imaging device for generation of a stereoscopic image to the object. However, as described above, the range image sensor is arranged to generate a range image corresponding to the direction opposite to the display screen from the display screen side. In addition, the imaging device for generating of the stereoscopic image is arranged so that the image capturing is performed in the direction opposite to the display screen from the display screen side. Thus, the distance to an object indicated by the range image according to the present embodiment can be regarded as a range that is equivalent to the distance from the display screen to the object.

The description will be mainly given by taking a case where the range image according to the present embodiment is generated based on the stereoscopic image by the range image sensor as an example.

More specifically, the information processing apparatus according to the present embodiment determines the specified position on the display screen based on the range image, for example by performing (1) point cloud generation process and (2) specified position determination process described below.

(1) Point Cloud Generation Process

The information processing apparatus according to the present embodiment generates a point cloud from the range image.

In this description, a point cloud is obtained by displacing a measured point on a range image represented in a two-dimensional image to a point on a three-dimensional space and is a set of points (referred to as "point group" hereinafter) represented in three-dimensional coordinates. The point cloud is obtained by representing a surface of an object by a point group. The information processing apparatus according to the present embodiment generates the point cloud from the range image, for example by representing a surface of an object included in the range image by a point group that contains a point (x, y, z), which is represented by a horizontal direction coordinate x, a vertical direction coordinate y, and a depth value z. In this connection, the three-dimensional coordinate of each point of the point cloud is represented by regarding a preset position, such as a predetermined position on a display screen (e.g., a central point on the display screen and a position on a left end of the display screen), as the origin.

As a specific example, the information processing apparatus according to the present embodiment generates a point cloud by Formulas (1) to (3) below, where "w" is the number of horizontal pixels of the range image sensor, "h" is the number of vertical pixels of the range image sensor, "d" is the depth value in a pixel (u, v) on the range image, "haov" is the horizontal angle of view of the range image sensor, and "vaov" is the vertical angle of view of the range image sensor. In this connection, when the range image indicates the absolute distance from the range image sensor and the angle of view of the range image sensor is known, the information processing apparatus according to the present embodiment is capable of generating a real-scale point cloud by Formulas (1) to (3) below.

[Math. 1]
$$x = (u - w/2) \cdot d \cdot \tan\left\{(haov/2) \cdot \frac{u}{w/2}\right\} \quad \text{Formula (1)}$$

[Math. 2]
$$y = (v - h/2) \cdot d \cdot \tan\left\{(vaov/2) \cdot \frac{v}{h/2}\right\} \quad \text{Formula (2)}$$

[Math. 3]
$$z = d \quad \text{Formula (3)}$$

The point cloud generation process according to the present embodiment is not limited to the generation of a point cloud by the calculations shown in Formulas (1) to (3) above. The information processing apparatus according to the present embodiment may generate the point cloud, for example using any technique capable of generating a point cloud.

(2) Specified Position Determination Process

The information processing apparatus according to the present embodiment performs the principal component analysis on the point cloud generated by the process of the above item (1) (point cloud generation process), and detects a vector corresponding to an object relating to position specification based on a result obtained by the principal component analysis. In this connection, examples of the object relating to position specification according to the present embodiment include any device that can be used in specifying a position by an operator, such as the operator's arm part and a pointing stick.

Then, the information processing apparatus according to the present embodiment determines a specified position based on a vector corresponding to the detected object relating to position specification. The information processing apparatus according to the present embodiment calculates an intersection point between the display screen and a vector of a first principal component that serves as a vector corresponding to an object relating to position specification and that starts at a predetermined position in the point group obtained by performing the principal component analysis. Then, the information processing apparatus according to the present embodiment determines a position corresponding to the calculated intersection point on the display screen as the specified position. Examples of the predetermined position in the point group obtained by performing the principal component analysis include the center of gravity of the point group.

The information processing apparatus according to the present embodiment sets the vector of the first principal component obtained by performing the principal component analysis to be the vector corresponding to the object relating to position specification. The first principal component is represented by the straight line corresponding to the direction having the largest variance in the point group that constitutes a point cloud.

In this connection, the information processing apparatus according to the present embodiment selectively calculates an intersection point between the vector of the first principal component and the display screen, for example based on a comparison result obtained by comparing a principal component score of the first principal component with a principal component score of the second principal component obtained by performing the principal component analysis.

The principal component score of the first principal component is a "sum of values obtained by substituting a coordinate of each point that constitutes a point cloud for the straight line corresponding to the direction having the largest variance in the point group that constitutes the point cloud". In addition, the second principal component is represented by the straight line corresponding to the direction having the second largest variance in the point group that constitutes the point cloud. The principal component score of the second principal component is a "sum of values obtained by substituting a coordinate of each point that constitutes a point cloud for the straight line corresponding to the direction having the second largest variance in the point group that constitutes the point cloud". In other words, the first principal component has the largest principal component score, and the second principal component has the second largest principal component.

The information processing apparatus according to the present embodiment calculates an intersection point between the vector of the first principal component and the display screen, for example when a ratio between the principal component score of the first principal component and the principal component score of the second principal component is greater than or equal to a predetermined threshold (or when the ratio is greater than the threshold, and this is similarly applied to the following description). In addition, the information processing apparatus according to the present embodiment does not calculate an intersection point between the vector of the first principal component and the display screen, for example when the ratio between the principal component score of the first principal component and the principal component score of the second principal component is less than a predetermined threshold (or when the ratio is less than or equal to the threshold, and this is similarly applied to the following description).

The threshold according to the present embodiment is set to a value that allows the intersection point between the vector of the first principal component and the display screen to be calculated when a predetermined action related to the position specification by an operator, such as pointing action by the operator, is performed, and is set to a value that prevents the intersection point between the vector of the first principal component and the display screen from being obtained when an operator does not perform a predetermined action (e.g., the optimum value is set experimentally). The threshold according to the present embodiment may be a value adjustable by the user operation.

As one example, the intersection point between the vector of the first principal component and the display screen is selectively calculated based on the comparison result obtained by comparing the principal component score of the first principal component and the principal component score of the second principal component as described above. Thus, it is possible to prevent the specified position from being determined although the operator does not perform a predetermined action related to the position specification, such as pointing action.

A specific example of the specified position determination process according to the present embodiment will be described later.

The information processing apparatus according to the present embodiment performs, for example the process of the above item (1) (point cloud generation process) and the process of the above item (2) (specified position determination process) as the process for implementing the information processing method according to the present embodiment. The information processing apparatus according to the present embodiment determines a position corresponding to the intersection point between the vector of the first principal component and the display screen as the specified position, based on an analysis result obtained by performing the principal component analysis on the point cloud generated based on the range image in the process of the above item (1) (point cloud generation process), in the process of the above item (2) (specified position determination process).

Thus, the information processing apparatus according to the present embodiment is capable of determining the specified position on the display screen based on the range image.

The specified position on the display screen can be determined based on the range image, and thus the information processing apparatus according to the present embodiment is capable of determining the specified position on the display screen stably.

The specified position on the display screen is determined by a vector corresponding to an object relating to position specification, which is detected based on the analysis result obtained by performing the principal component analysis on the point cloud. Thus, the information processing apparatus according to the present embodiment is capable of determining the specified position on the display screen with higher accuracy.

Furthermore, the specified position is determined based on the analysis result obtained by performing the principal component analysis on the point cloud. Thus, even when only the arm of the operator (an example of the object relating to position specification) is contained in the range image as one example, the information processing apparatus according to the present embodiment is capable of determining the specified position on the display screen.

[2] Specific Example of Process for Implementing Information Processing Method According to Present Embodiment FIG. 1 is a diagram illustrated to describe an example of the process for implementing the information processing method according to the present embodiment, and illustrates an example of the positional relationship between a display device 10 and a range image sensor (or imaging device) 12.

FIG. 1 also illustrates an example of a pointing operation performed by an operator U. The information processing apparatus according to the present embodiment processes a range image (or stereoscopic image) acquired from the range image sensor (or imaging device) 12 and determines a specified position P on a display screen of the display device 10. Although the information processing apparatus according to the present embodiment is not shown in FIG. 1, the display device 10 may serve as the information processing apparatus according to the present embodiment, or the range image sensor (or imaging device) 12 may serve as the information processing apparatus according to the present embodiment.

As shown in FIG. 1, the range image sensor (or imaging device) 12 is arranged below the display device 10 and observes the operator who faces the display screen side of the display device 10.

The positional relationship between the display device 10 and the range image sensor (or imaging device) 12 is not limited to the example shown in FIG. 1.

FIG. 2 is a diagram illustrated to describe the process for implementing the information processing method according to the present embodiment, and illustrates another example of the positional relationship between the display device 10 and the range image sensor (or imaging device) 12.

The range image sensor (or imaging device) 12 can be arranged at any one of the upper, lower, right, and left sides on the display screen of the display device 10, for example as shown in FIG. 2.

In this description, when the range image sensor (or imaging device) 12 is arranged on the lower side of the display screen, the range image sensor (or imaging device) 12 may be arranged on the floor, for example as shown in FIGS. 1 and 2, and thus there is a further advantage of easy to arrange. In addition, when the range image sensor (or imaging device) 12 is arranged on the upper side of the display screen, the influence of clothing worn by the operator on the process for implementing the information processing method according to the present embodiment is small due to its own weight. Furthermore, in this case, the parts extending from the arm to the fingertips are relatively flat, and thus there is an advantage that a vector corresponding to an object relating to position specification can be detected stably.

The range image sensor (or imaging device) 12 is arranged at a position where the distance between the range image sensor and the display device 10 is a longer distance in which the range image sensor (or imaging device) 12 can be arranged within "a distance regarded as a range in which the distance to the object indicated by the range image is equivalent to the distance from the display screen to the object". The arrangement of the range image sensor (or imaging device) 12 as described above makes it possible to further improve accuracy of the specified position on the display screen determined by the information processing apparatus according to the present embodiment.

The number of the installed range image sensors (or imaging devices) 12 and the positional relationship between the display device 10 and the range image sensor (or imaging device) 12 are not limited to the example shown in FIG. 1.

Figure 4:
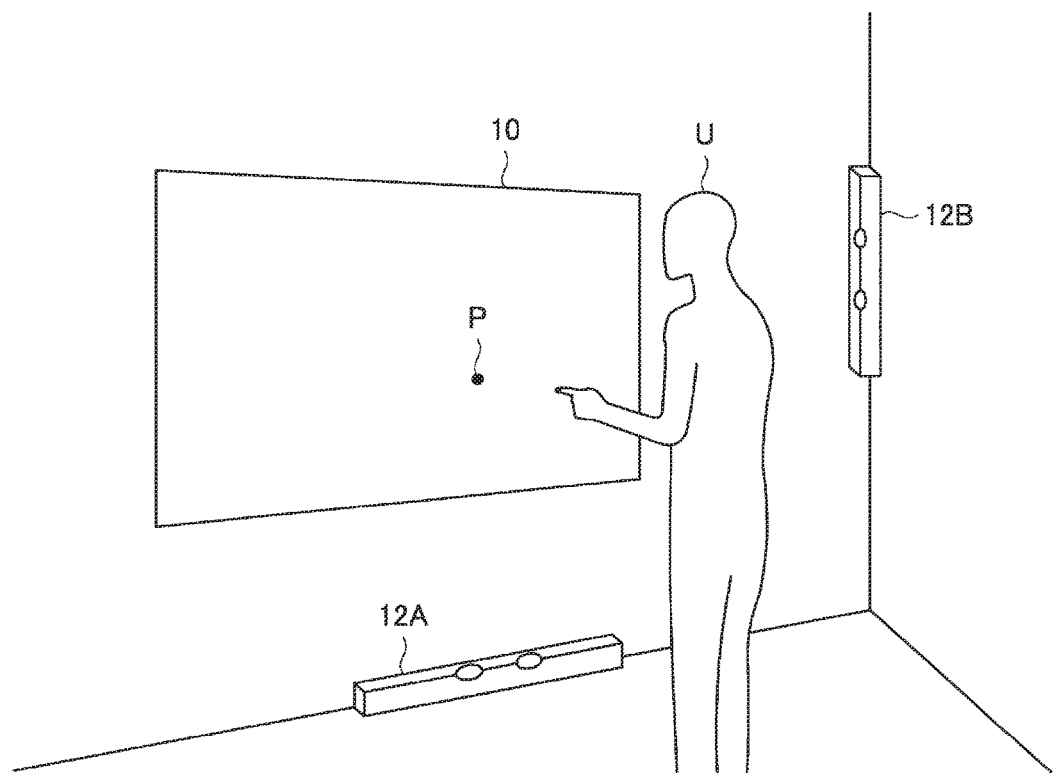
FIG. 4 is a diagram illustrated to describe an example of a process for implementing an information processing method according to an embodiment of the present disclosure.

FIGS. 3 and 4 are diagrams illustrated to describe an example of the process for implementing the information processing method according to the present embodiment, and illustrate another example of the number of the installed range image sensors (or imaging devices) 12 and the positional relationship between the display device 10 and the range image sensor (or imaging device) 12. FIG. 4 illustrates an example in which the number of the sensors is two, and a range image sensor (or imaging device) 12A and a range image sensor (or imaging device) 12B are arranged on "the lower side and right side of the display screen", respectively in FIG. 3.

In this connection, the respective cases of the number of the installed range image sensors (or imaging devices) 12 shown in FIG. 4 and the positional relationship between the display device 10 and the range image sensor (or imaging device) 12 have advantages in cases described in items (a) to (f) below.

(a) Case where the Number of Sensors is Two and the Range Image Sensors (or Imaging Devices) 12 are Arranged on "Upper Side and Left Side of the Display Screen"

The "advantage that the accuracy of the specified position that is first determined can be further improved" and the "advantage that the accuracy of the specified position corresponding to the pointing operation performed with the left hand when the operator is a single person can be further improved" are achieved.

(b) Case where the Number of Sensors is Two and the Range Image Sensors (or Imaging Devices) 12 are Arranged on "Upper Side and Right Side of the Display Screen"

The "advantage that the accuracy of the specified position that is first determined can be further improved" and the "advantage that the accuracy of the specified position corresponding to the pointing operation performed with the right hand when the operator is a single person can be further improved" are achieved.

(c) Case where the Number of Sensors is Two and the Range Image Sensors (or Imaging Devices) 12 are Arranged on "Lower Side and Left Side of the Display Screen"

The "advantage that the accuracy of the specified position that is first determined can be further improved" and the "advantage that the accuracy of the specified position corresponding to the pointing operation performed with the left hand when the operator is a single person can be further improved" are achieved.

(d) Case where the Number of Sensors is Two and the Range Image Sensors (or Imaging Devices) 12 are Arranged on "Lower Side and Right Side of the Display Screen"

The "advantage that the accuracy of the specified position that is first determined can be further improved" and the "advantage that the accuracy of the specified position corresponding to the pointing operation performed with the right hand when the operator is a single person can be further improved" are achieved.

(e) Case where the Number of Sensors is Three and the Range Image Sensors (or Imaging Devices) 12 are Arranged on "Upper Side, Left Side, and Right Side of the Display Screen"

The "advantage that the accuracy of the specified position corresponding to the pointing operation performed with the right and left hands when the operator is a single person can be further improved" is achieved.

(f) Case where the Number of Sensors is Three and the Range Image Sensors (or Imaging Devices) 12 are Arranged on "Lower Side, Left Side, and Right Side of the Display Screen"

The "advantage that the accuracy of the specified position corresponding to the pointing operation performed with the right and left hands when the operator is a single person can be further improved" is achieved.

When a plurality of range image sensors (or imaging devices) 12 process a plurality of range images to determine the specified position, for example as shown in FIGS. 3 and 4, the information processing apparatus according to the present embodiment generates a point cloud from each range image in the process of the above item (1) (point cloud generation process).

When a plurality of range images are processed to determine the specified position based on the plurality of range image sensors (or imaging devices), the information processing apparatus according to the present embodiment merges a plurality of the generated point clouds in the process of the above item (2) (specified position determination process) as one example. Then, the information processing apparatus according to the present embodiment determines the specified position corresponding to the plurality of range images by processing the merged single point cloud.

The process of the above item (2) (specified position determination process) in the case where the plurality of range images are processed to determine the specified position based on the plurality of range image sensors (or imaging devices) is not limited to the process performed by merging a plurality of point clouds.

As one example, the information processing apparatus according to the present embodiment performs the process of the above item (2) (specified position determination process) on each of the plurality of the generated point clouds and determines the specified position corresponding to each of the plurality of the point clouds. Then, the information processing apparatus according to the present embodiment determines the specified position corresponding to the plurality of range images by merging the x-coordinate of the specified position on a display screen (coordinate corresponding to the horizontal direction component) and the y-coordinate of the specified position on the display screen (coordinate corresponding to the vertical direction component), which correspond to each of the plurality of point clouds. The information processing apparatus according to the present embodiment merges the x-coordinate of the specified position on the display screen and the y-coordinate of the specified position on the display screen, for example by calculating an average value of the x-coordinates of the specified position on the display screen and an average value of the y-coordinates of the specified position on the display screen, which correspond to each of the plurality of point clouds.

For example as shown in FIGS. 3 and 4, when the plurality of range images are processed based on a plurality of the range image sensors (or imaging devices), the information processing apparatus according to the present embodiment determines the specified position, for example by performing the process as described above.

The process for implementing the information processing method according to the present embodiment will be described in detail by taking the situation shown in FIG. 1 as an example.

Figure 5:
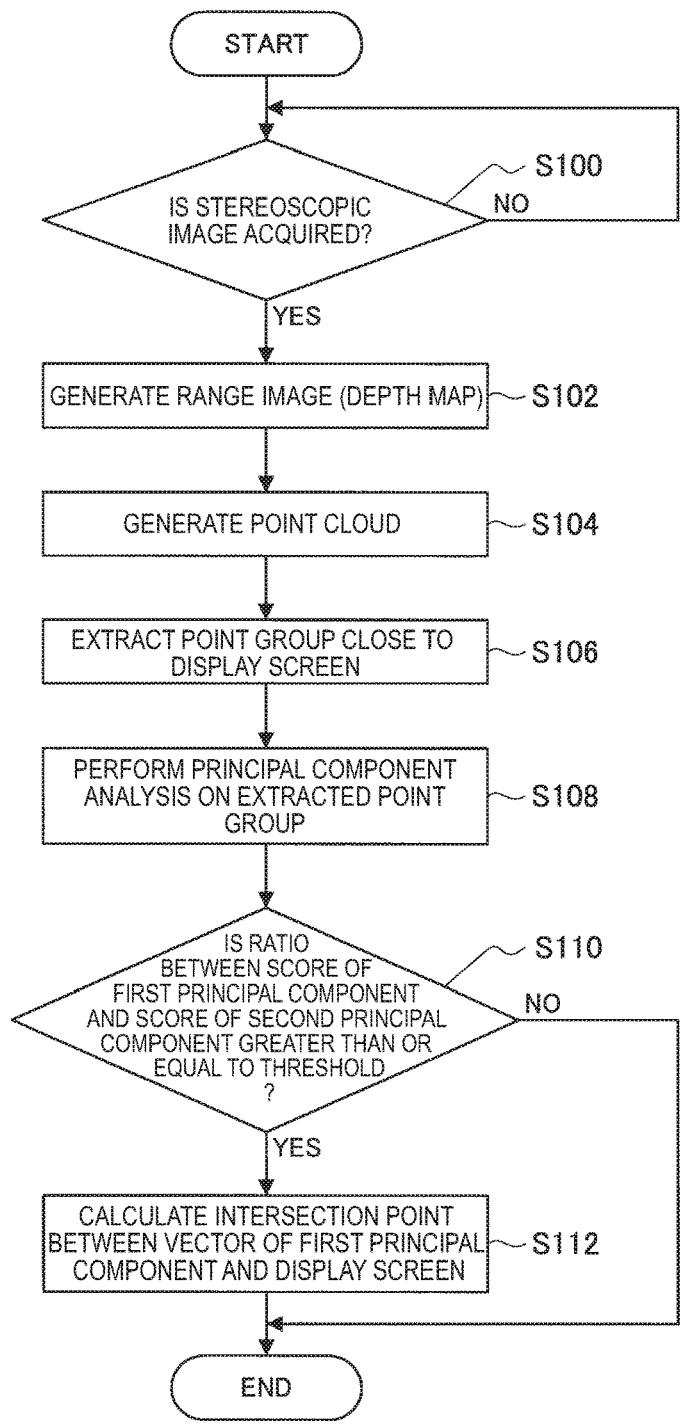
FIG. 5 is a flowchart illustrating an example of a process for implementing an information processing method according to an embodiment of the present disclosure.

FIG. 5 is a flowchart illustrating an example of the process for implementing the information processing method according to the present embodiment. In this description, in FIG. 5, a process in step S104 corresponds to the process of the above item (1) (point cloud generation process), and a process in steps S106 to S112 corresponds to an example of the process of the above item (2) (specified position determination process).

FIG. 5 illustrates a process in the case where the information processing apparatus according to the present embodiment generates a range image based on a stereoscopic image captured by an imaging device. The information processing apparatus according to the present embodiment, when it processes the range image acquired from a range image sensor, sets the range image in the process in step S100 shown in FIG. 5 to be a target to be judged, and does not perform the process in step S102 shown in FIG. 5.

The information processing apparatus according to the present embodiment judges whether a stereoscopic image is acquired (S100). If it is not judged in step S100 that the stereoscopic image is acquired, the information processing apparatus according to the present embodiment does not proceed to the next step.

On the other hand, if it is judged in step S100 that the stereoscopic image is acquired, the information processing apparatus according to the present embodiment generates a range image based on the stereoscopic image (S102). The information processing apparatus according to the present embodiment generates the range image from parallax in the stereoscopic image. The information processing apparatus according to the present embodiment generates the range image using any technique capable of generating the range image from the stereoscopic image, such as a method using the principle of triangulation.

In this connection, when the range image indicates the absolute distance from the range image sensor, that is, when the real-scale depth information is acquired from the range image or the angle of view of the range image sensor is known, the information processing apparatus according to the present embodiment is capable of generating the real-scale point cloud by Formulas (1) to (3). The generation of the real-scale point cloud in the above case makes it possible to reproduce the real-scale three-dimensional space.

The information processing apparatus according to the present embodiment extracts a point group that is close to the display screen from the point cloud (S106).

The information processing apparatus according to the present embodiment detects a point having the smallest depth value z from among point groups that constitute the point cloud as a point that is closest to the display screen (sometimes referred to as "tip" hereinafter), as one example. Then, the information processing apparatus according to the present embodiment extracts a point group included within a sphere with a predetermined radius around a point that is closest to the display screen. The predetermined radius may be a preset fixed value or may be a variable value adjustable by the user or the like. The information processing apparatus according to the present embodiment is also capable of extracting a point group included in the space having a predetermined shape that contains the point that is closest to the display screen.

The information processing apparatus according to the present embodiment performs the principal component analysis on the extracted point group (S108).

In this connection, the information processing apparatus according to the present embodiment divides the extracted point group into a plurality of point groups by segmentation. The information processing apparatus according to the present embodiment divides the extracted point group into a plurality of point groups, for example by using "Euclidean cluster" of the 3D point group processing library (referred to as point cloud library (PCL) hereinafter). Then, the information processing apparatus according to the present embodiment performs the principal component analysis on a point group having the largest number of points among the divided point groups.

For example, the extracted point groups are processed by segmentation and some point groups included in the extracted point groups are subjected to the principal component analysis. Thus, it is possible to prevent the influence of a point group corresponding to other objects than the object relating to position specification on the result obtained by the principal component analysis. Thus, the segmentation of the extracted point groups and the principal component analysis performed on some point groups included in the extracted point groups make it possible for the information processing apparatus according to the present embodiment to improve accuracy of the determined specified position on the display screen.

When the principal component analysis is performed in step S108, the information processing apparatus according to the present embodiment judges whether the ratio between the principal component score of the first principal component and the principal component score of the second principal component (e.g., "principal component score of first principal component/principal component score of second principal component") is greater than or equal to a predetermined threshold (S110). When the ratio between the principal component score of the first principal component and the principal component score of the second principal component is represented by "principal component score of first principal component/principal component score of second principal component", examples of the predetermine threshold according to the present embodiment include a value that is set, such as five. The predetermine threshold according to the present embodiment may be a preset fixed value or may be a variable value adjustable by the user or the like.

The case where the ratio between the principal component score of the first principal component and the principal component score of the second principal component is judged to be greater than or equal to the predetermined threshold in step S110 corresponds to a case where an object corresponding to the point group obtained by performing the principal component analysis corresponds to a case where an object corresponding to the point group obtained by performing the principal component analysis is judged to be a rod-shaped object (an example of the object relating to position specification).

If it is not judged in step S110 that the ratio between the principal component score of the first principal component and the principal component score of the second principal component is greater than or equal to the predetermined threshold, the information processing apparatus according to the present embodiment terminates the process without the determination of specified position.

If it is judged in step S110 that the ratio between the principal component score of the first principal component and the principal component score of the second principal component is greater than or equal to the predetermined threshold, the information processing apparatus according to the present embodiment calculates an intersection point between a vector of the first principal component and the display screen and determines a position corresponding to the calculated intersection point on the display screen as the specified position (S112). The information processing apparatus according to the present embodiment determines the intersection point between the display screen and a vector of the first principal component having a predetermined position in the point group as a starting point, for example such as the center of gravity of the point group as the specified position. The predetermined position in the point group may be set in advance or may be adjustable by the user or the like.

Figure 6:
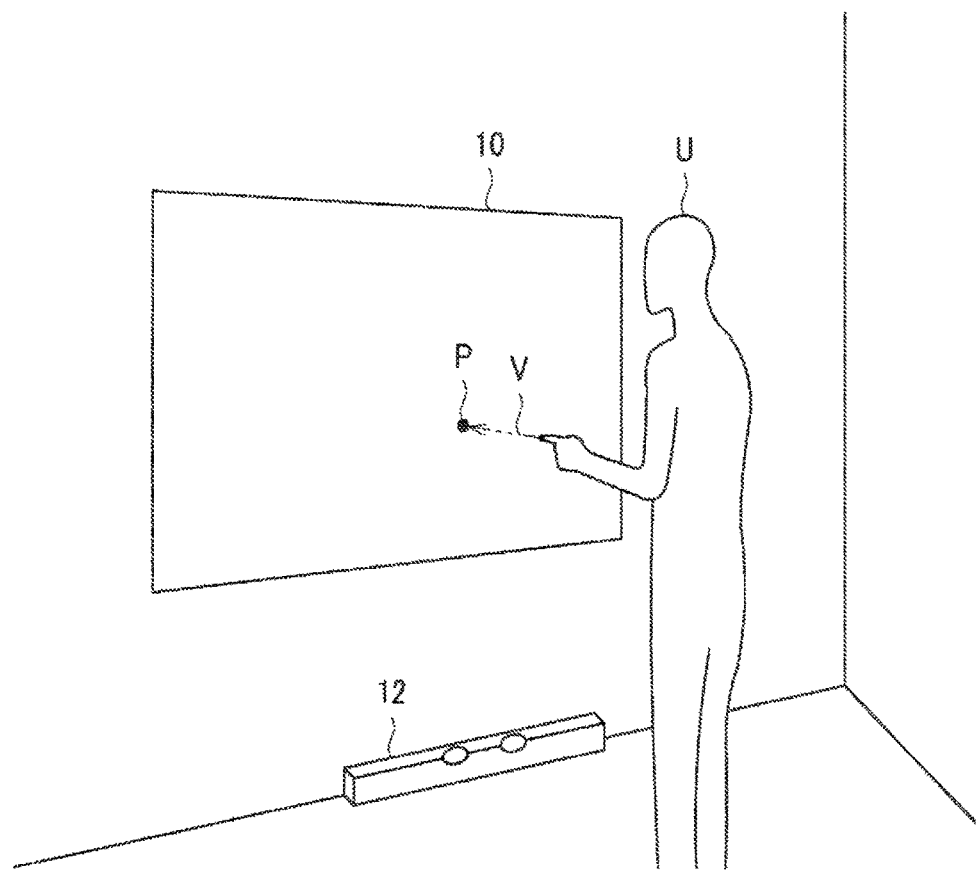
FIG. 6 is a diagram illustrated to describe a process for implementing an information processing method according to an embodiment of the present disclosure.

FIG. 6 is a diagram illustrated to describe the process for implementing the information processing method according to the present embodiment. As shown in FIG. 6, the intersection point between the vector V of the first principal component and the display screen is determined as the specified position P.

The information processing apparatus according to the present embodiment determines the specified position on the display screen based on the range image, for example by performing the process shown in FIG. 5, as the process for implementing the information processing method according to the present embodiment.

The process for implementing the information processing method according to the present embodiment is not limited to the process shown in FIG. 5.

For example, the information processing apparatus according to the present embodiment may perform the process in steps S106 to S112 repeatedly on the point cloud generated in step S104 of FIG. 5.

More specifically, when the principal component analysis is performed in step S108 of FIG. 5 as one example, the information processing apparatus according to the present embodiment judges whether the number of times that the principal component analysis is performed on the point cloud generated in step S104 of FIG. 5 satisfies a condition relating to a given number of times such as six times. Examples of the condition relating to the given number of times include a condition that the number of times the principal component analysis is performed is greater than or equal to a given number of times and a condition that the number of times the principal component analysis is performed is greater than a given number of times. The condition relating to the given number of times may be a preset fixed condition or may be a condition that can be appropriately changed by the user or the like.

If it is not judged that the condition relating to the given number of times is satisfied, the information processing apparatus according to the present embodiment excludes a point group that is subjected to the principal component analysis from a target to be processed and again performs the process in step S106 and the subsequent steps in FIG. 5.

If it is judged that the condition relating to the given number of times is satisfied, the information processing apparatus according to the present embodiment terminates the process without performing the process in steps S106 to S112.

For example as described above, the repetition of the process in steps S106 to S112 shown in FIG. 6 depending on a result obtained by judging the condition relating to the given number of times makes it possible for the information processing apparatus according to the present embodiment to determine a plurality of specified positions that correspond to, for example a pointing operation by both hands of an operator, a pointing operation by a plurality of operators, or the like.

The process in steps S104 to S112 shown in FIG. 5 that correspond to the process of the above item (1) (point cloud generation process) and the process of the above item (2) (specified position determination process) will be described in detail.

Figure 7:
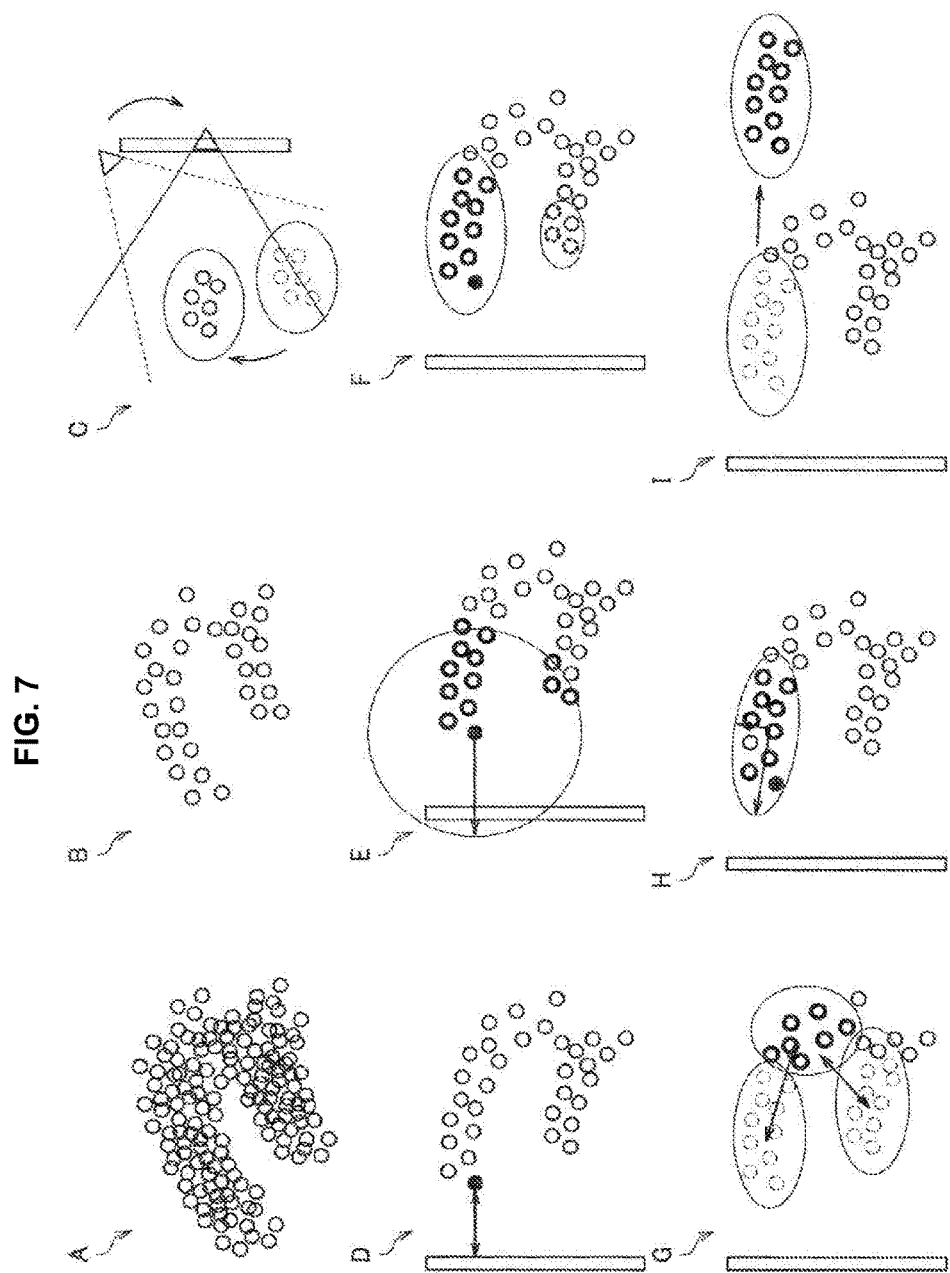
FIG. 7 is a diagram illustrated to describe a process for implementing an information processing method according to an embodiment of the present disclosure.

FIG. 7 is a diagram illustrated to describe an example of the process for implementing the information processing method according to the present embodiment. The portions A to I of FIG. 7 illustrate the process for implementing the information processing method according to the present embodiment in time series. The portions A to C of FIG. 7 correspond to the process shown in step S104 shown in FIG. 5, that is, the process of the above item (1) (point cloud generation process). The portions D to I of FIG. 7 correspond to the process shown in step S112 shown in FIG. 5, that is, the process of the above item (2) (specified position determination process).

The portion A of FIG. 7 illustrates an example of the point cloud generated based on the range image. In FIG. 7, the information processing apparatus according to the present embodiment is assumed to perform the process on the point groups shown in the portion A of FIG. 7 hereinafter.

The information processing apparatus according to the present embodiment performs a filtering process on the point groups shown in the portion A of FIG. 7. The information processing apparatus according to the present embodiment uses the "pass-through filter" of PCL (filter used to remove an invalid point group in a process of depth 0 of occlusion), the "voxel grid filter" of PCL (filter used to perform the down-sampling to be replaced with a representative point in the space of 15 [mm]), or the "outlier removal filter" of PCL (filter used to remove an outlier point (litter) being scattered on the space). The filter used for the filtering process in the information processing apparatus according to the present embodiment is not limited to the examples described above.

The portion B of FIG. 7 illustrates an example of a result obtained by performing the filtering process on the point groups shown in the portion A of FIG. 7. The filtering process makes it possible to achieve the effects of the reduction in calculation amounts and the prevention of erroneous recognition of the object relating to position specification.

The information processing apparatus according to the present embodiment multiplies the point groups obtained after the filtering process shown in the portion B of FIG. 7 by a rotation matrix (translation matrix) and shifts the point groups. The information processing apparatus according to the present embodiment shifts the point groups to correspond to, for example the case where they are observed from a predetermined position on the display screen, such as a central position on the display screen. As one example, when the range image sensor 12 is installed on the upper side of the display screen shown in FIG. 2, the information processing apparatus according to the present embodiment performs a rotation in the pitch direction and a movement in the vertical direction. The portion C of FIG. 7 illustrates a conceptual view of a case where the point groups obtained after the filtering process shown in the portion B of FIG. 7 are shifted.

The shift of the point groups as shown in the portion C of FIG. 7 makes it possible for the information processing apparatus according to the present embodiment to perform the process for detecting a vector corresponding to an object relating to position specification with more ease.

The information processing apparatus according to the present embodiment performs, for example a process shown by referring to the portions A to C of FIG. 7 in step S104 shown in FIG. 5.

The information processing apparatus according to the present embodiment detects a point having the smallest depth value z from among all points that constitute the point group as the tip, as shown in the portion D of FIG. 7. The process shown in the portion D of FIG. 7 corresponds to the step S106 shown in FIG. 5.

As shown in the portion E of FIG. 7, the information processing apparatus according to the present embodiment extracts a point included within a sphere having a radius of 300 [mm] (an example of a predetermined radius) around the point (tip) that is detected in the process shown in the portion D of FIG. 7. The portion E of FIG. 7 illustrates an example of extracting a point group including a plurality of points.

As shown in the portion F of FIG. 7, the information processing apparatus according to the present embodiment divides the point group extracted by the process shown in the portion E of FIG. 7 into a plurality of point groups by segmentation. The information processing apparatus divides the extracted point group into a plurality of point groups, for example by using "Euclidean cluster" of the PCL.

As shown in the portion F of FIG. 7, the division of the extracted point group into a plurality of point groups by segmentation makes it possible to separate the object relating to position specification from other objects.

The information processing apparatus according to the present embodiment judges whether a point group having the largest number of points from among the divided point groups in the portion F of FIG. 7 is a point group that contains a point adjacent to a point contained in the point group corresponding to the object relating to position specification. The process for the judging described above corresponds to a process of judging whether the point group having the largest number of points from among the divided point groups in the portion F of FIG. 7 is linked to the point group corresponding to the object relating to position specification. The portion G of FIG. 7 illustrates a conceptual view of the case where the point group having the largest number of points is the point group that contains a point adjacent to a point contained in the point group corresponding to the object relating to position specification.

When a point in which the distance between points contained in the point group corresponding to the object relating to position specification is smaller than or equal to a predetermined threshold (or smaller than the threshold) is a point contained in the point group having the largest number of points, the information processing apparatus according to the present embodiment judges that the point group having the largest number of points is the point group that contains the adjacent points. A method of judging in the process shown in the portion G of FIG. 7 is not limited to the method described above. The information processing apparatus according to the present embodiment can perform any process capable of judging whether the point group having the largest number of points is linked to the point group corresponding to the object relating to position specification In the process for the portion G of FIG. 7, if the point group having the largest number of points from among the divided point groups in the portion F of FIG. 7 is judged to be a point group which contains a point adjacent to a point contained in the point group corresponding to the object relating to position specification, the information processing apparatus according to the present embodiment performs the principal component analysis on the point group having the largest number of points. Then, the information processing apparatus according to the present embodiment selectively calculates the position of the intersection between the display screen and a vector of the first principal component, which corresponds to an object relating to position specification. The portion H of FIG. 7 illustrates a conceptual view of a case where the principal component analysis is performed on the point group having the largest number of points from among the divided point groups in the portion F of FIG. 7.

In the process for the portion G of FIG. 7, if the point group having the largest number of points from among the divided point groups in the portion F of FIG. 7 is not judged to be a point group which contains a point adjacent to a point contained in the point group corresponding to the object relating to position specification, the information processing apparatus according to the present embodiment does not perform the principal component analysis on the point group having the largest number of points. Then, the information processing apparatus according to the present embodiment excludes the point group having the largest number of points from a target to be processed. The portion I of FIG. 7 illustrates a conceptual view of a case where the point group having the largest number of points from among the divided point groups in the portion F of FIG. 7 is excluded from a target to be processed.

The information processing apparatus according to the present embodiment excludes the point group having the largest number of points from a target to be processed, for example by rewriting the depth value z of points that constitute the point group having the largest number of points contained in the divided point groups into "9999999" or the like or removing the point group having the largest number of points.

The information processing apparatus according to the present embodiment performs the process shown by referring to the portions D to I of FIG. 7 in steps S108 to S112 shown in FIG. 5.

The information processing apparatus according to the present embodiment may judge whether the number of times that the principal component analysis is performed on the generated point cloud shown in the portion A of FIG. 7 satisfies the condition relating to the given number of times as described above. If it is not judged that the condition relating to the given number of times is not satisfied, the information processing apparatus according to the present embodiment excludes a point group obtained by performing the principal component analysis from a target to be processed and again performs the process corresponding to the portion D of FIG. 7 and the subsequent process (the process in step S106 in FIG. 5 and the subsequent step) repeatedly.

[3] Other Processes for Implementing Information Processing Method According to Present Embodiment The information processing apparatus according to the present embodiment determines the specified position on the display screen based on the range image, for example by performing the process of the above item (1) (point cloud generation process) and the process of the above item (2) (specified position determination process) as the process for implementing the information processing method according to the present embodiment, as described above.

The process for implementing the information processing method according to the present embodiment is not limited to the process of the above item (1) (point cloud generation process) and the process of the above item (2) (specified position determination process). For example, although the process for implementing the information processing method according to the present embodiment is capable of determining the specified position with high accuracy, a deviation may occur between the determined position on the display screen and a position expected by the operator, for example due to factors like a sense of each user serving as the operator.

Thus, the information processing apparatus according to the present embodiment performs (3) process of determining an offset amount used to adjust the specified position (referred to as "offset amount determination process" hereinafter), as the process for implementing the information processing method according to the present embodiment.

(3-1) First Example of Offset Amount Determination Process

The information processing apparatus according to the present embodiment determines an offset amount, for example based on a predetermined position on the display screen and the specified position determined by the process of the above item (2) (specified position determination process).

More specifically, as one example, the information processing apparatus according to the present embodiment calculates a difference between a specified position determined in a case where the operator specifies a particular position (position of a particular point on the display screen or a position in a particular region) on the display screen and a position corresponding to the particular position, for each of x-coordinate (coordinate corresponding to the horizontal direction component) and y-coordinate (coordinate corresponding to the vertical direction component). Then, the information processing apparatus according to the present embodiment determines the calculate difference of the x-coordinates as an offset amount used to adjust the x-coordinate of the specified position on the display screen and determines the calculated difference of the y-coordinates as an offset amount used to adjust the y-coordinate of the specified position on the display screen.

(3-2) Second Example of Offset Amount Determination Process

The offset amount according to the present embodiment is not limited to the above. The offset amount according to the present embodiment may be an angle for adjusting the yaw angle of a vector of the first principal component obtained from the principal component analysis and an angle for adjusting the pitch angle of a vector of the first principal component obtained from the principal component analysis.

The information processing apparatus according to the present embodiment determines the angle for adjusting the yaw angle and angle for adjusting the pitch angle as the offset amount, for example based on the difference between "vector of the first principal component obtained by performing the principal component analysis (vector corresponding to the object relating to position specification)" and "vector in a direction from a predetermined position corresponding to the object relating to position specification to a predetermined position on the display screen". In this connection, examples of the predetermined position corresponding to the object relating to position specification include the center of gravity of the point group corresponding to the object relating to position specification.

The information processing apparatus according to the present embodiment determines the offset amount, for example by performing the offset amount determination process according to the first example shown in the above item (3-1) or the offset amount determination process according to the second example shown in the above item (3-2).

When the offset amount is determined, the information processing apparatus according to the present embodiment records the determined offset amount in, for example, a storage unit (described later) included in the information processing apparatus according to the present embodiment, an external recording medium connected to the information processing apparatus according to the present embodiment, or the like.

When the offset amount is determined, the information processing apparatus according to the present embodiment may record the determined offset amount and data indicating an operator (e.g., ID or the like indicating the operator) in a recording medium in association with each other. The information processing apparatus according to the present embodiment specifies the data indicating an operator associated with the offset amount based on a recognition result of an operator that is recognized using "biometrics such as face recognition and voice recognition", "ID and password", or the like. In this connection, the process for the recognition of an operator may be performed by the information processing apparatus according to the present embodiment or may be an external apparatus of the information processing apparatus according to the present embodiment.

When the offset amount is determined, the information processing apparatus according to the present embodiment may record data indicating the hand relating to the user's operation (e.g., ID or the like indicating the right or left hand) and the determined offset amount in a recording medium in association with each other. The information processing apparatus according to the present embodiment specifies the data indicating the hand relating to the operator's operation associated with the offset amount, for example based on a recognition result of the hand obtained by an image process performed on a captured image that is photographed in the direction opposite to the display screen from the display screen side. In this connection, the process for the recognition of the hand relating to the operator's operation may be performed by the information processing apparatus according to the present embodiment or may be an external apparatus of the information processing apparatus according to the present embodiment.

Furthermore, when the offset amount is determined, for example, the information processing apparatus according to the present embodiment may record the data indicating the operator, the data indicating the hand relating to the operator's operation, and the determined offset amount in a recording medium in association with each other.

The offset amount determination process according to the present embodiment is not limited to the offset amount determination process according to the first example shown in the above item (3-1) or the offset amount determination process according to the second example shown in the above item (3-2).

As one example, the information processing apparatus according to the present embodiment may determine the offset amount selectively for each operator based on the recognition result of the operator.

When the offset amount is not determined for the operator recognized by biometrics or the like, the information processing apparatus according to the present embodiment determines the offset amount, as one example. When the offset amount is determined for the operator recognized by biometrics or the like, the information processing apparatus according to the present embodiment does not determine the offset amount, as on example. Even when the offset amount is determined for the recognized operator, the information processing apparatus according to the present embodiment can determine the offset amount, for example based on the user's operation or the like to perform the redetermination of the offset amount.

When the offset amount determination process is performed, the information processing apparatus according to the present embodiment adjusts the specified position by the determined offset amount to determine the specified position in the process of the above item (2) (specified position determination process).

When the offset amount is determined for each operator, the information processing apparatus according to the present embodiment adjusts the specified position by the offset amount corresponding to the recognized operator, for example based on the recognition result of the operator. When the offset amount is determined for each hand relating to the operator's operation, the information processing apparatus according to the present embodiment adjusts the specified position by the offset amount corresponding to the hand relating to the operation of the recognized operator, for example based on the recognition result of the hand relating to the operator's operation. Furthermore, when the offset amount is determined for each operator or for each hand relating to the operator's operation, the information processing apparatus according to the present embodiment can adjust the specified position by the offset amount corresponding to the recognized operator and the hand relating to the operation of the recognized operator, for example based on the recognition result of the operator and the recognition result of the hand relating to the operator's operation, respectively.

When the offset amount according to the present embodiment is the offset amount for adjusting the x-coordinate and the offset amount for adjusting the y-coordinate, the information processing apparatus according to the present embodiment adjusts the specified position, for example by adding the corresponding determined offset amount to each of the x-coordinate value and the y-coordinate value of the determined specified position. When the offset amount according to the present embodiment is the angle for adjusting the yaw angle of a vector of the first principal component obtained from the principal component analysis and the angle for adjusting the pitch angle of the vector of the first principal component obtained from the principal component analysis, the information processing apparatus according to the present embodiment adjusts the vector corresponding to the object relating to position specification by the offset amount and then determines the specified position.

The information processing apparatus according to the present embodiment can determine the specified position by performing the offset amount determination process and by adjusting the specified position by the determined offset amount in the process of the above item (2) (specified position determination process), thereby correcting the deviation between the determined position on the display screen and a position expected by the operator. Thus, the determination of the specified position by the information processing apparatus according to the present embodiment that performs the offset amount determination process and adjusts the specified position by the determined offset amount in the process of the above item (2) (specified position determination process) allows the operator to determine the specified position with higher accuracy.

Figure 8:
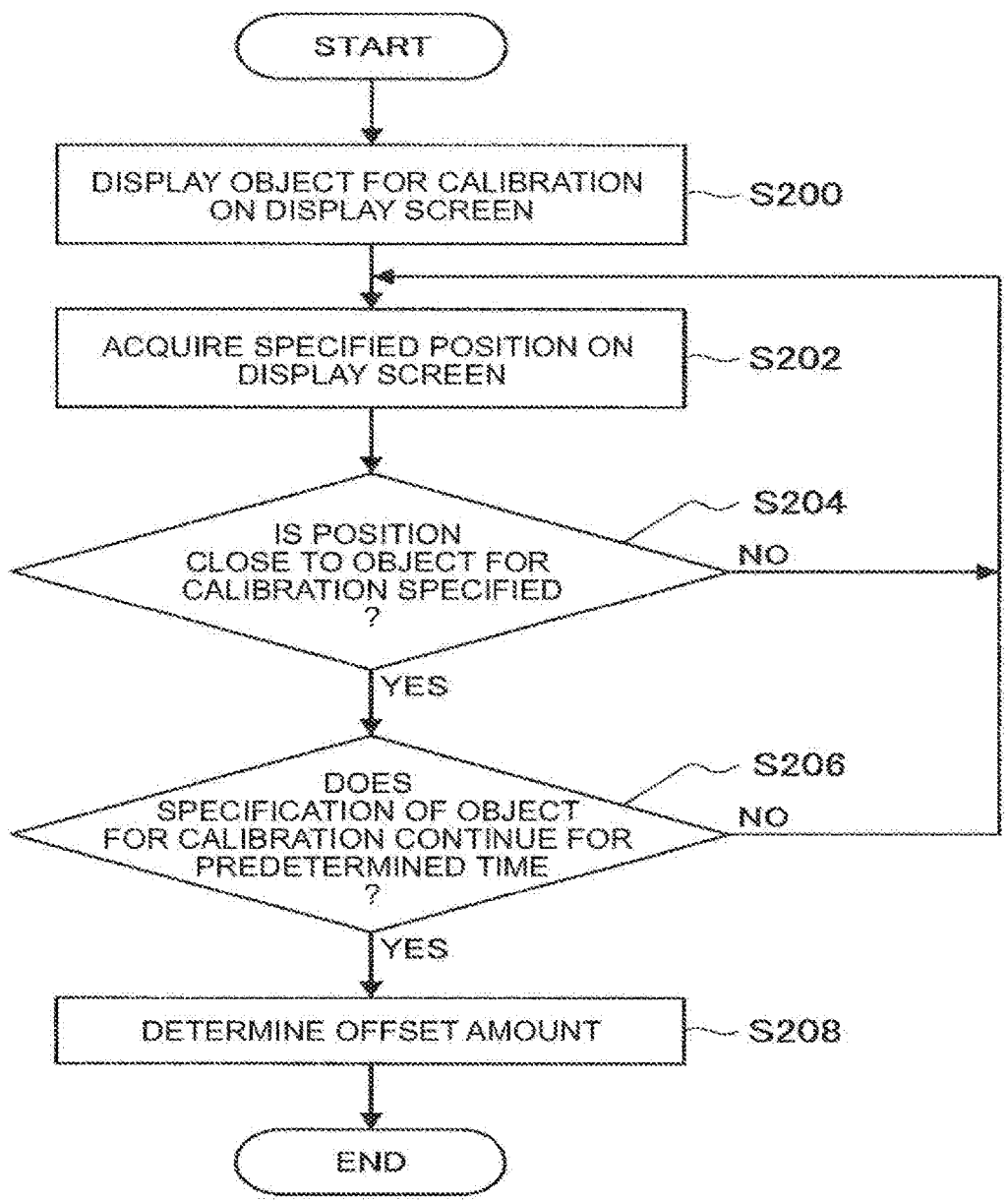
FIG. 8 is a flowchart illustrating an example of an offset amount determination process according to an embodiment of the present disclosure.

A specific example of the offset amount determination process according to the present embodiment will be described. FIG. 8 is a flowchart illustrating an example of the offset amount determination process according to the present embodiment.

The information processing apparatus according to the present embodiment displays the object for calibration on the display screen (S200). The object for calibration according to the present embodiment is an object used to cause the operator to specify a particular position on the display screen. An example of the particular position according to the present embodiment includes a predetermined position included in the object for calibration (e.g., a central position of the object for calibration).

Figure 9:
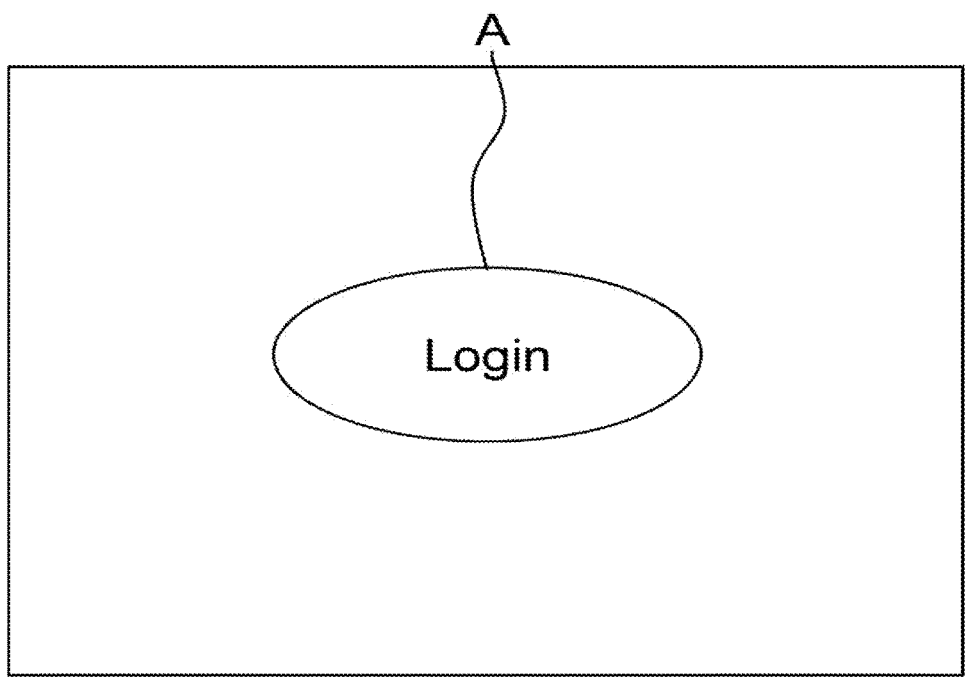
FIG. 9 is a diagram illustrated to describe an example of a display screen on which an object for calibration is displayed, according to an embodiment of the present disclosure.

FIG. 9 is a diagram illustrated to describe an example of the display screen on which the object for calibration according to the present embodiment is displayed. The portion A shown in FIG. 9 is an example of the object for calibration according to the present embodiment. In FIG. 9, a login button serving as the object for calibration according to the present embodiment is illustrated. In the example shown in FIG. 9, a login operation (operation start action) and the offset amount determination process according to the present embodiment are performed simultaneously.

As shown in FIG. 9, the simultaneous performance of the login operation and the offset amount determination process according to the present embodiment allows the information processing apparatus according to the present embodiment to determine the offset amount without causing the user to perform an operation only for the offset amount determination process according to the present embodiment. Thus, as shown in FIG. 9, the simultaneous performance of the login operation and the offset amount determination process according to the present embodiment makes it possible to determine the offset amount while reducing the load on the user.

Noted that, the object for calibration according to the present embodiment is not limited to the login button, and the display screen on which the object for calibration according to the present embodiment is displayed is not limited to the example shown in FIG. 9.

The information processing apparatus according to the present embodiment acquires the specified position on the display screen (S202). The information processing apparatus according to the present embodiment acquires the specified position by performing the process of the above item (2) (specified position determination process) as one example.

The information processing apparatus according to the present embodiment judges whether a specified position is close to the object for calibration (S204). As on example, when the distance between the predetermined position included in the object for calibration and the specified position acquired in step S204 is smaller than or equal to a predetermined threshold (or when the distance is smaller than the threshold), the information processing apparatus according to the present embodiment judges that the specified position is close to the object for calibration.

If it is not judged in step S204 that the specified position is close to the object for calibration, the information processing apparatus according to the present embodiment repeats the process in step S202 and the subsequent steps.

If it is judged in step S204 that the specified position is close to the object for calibration, the information processing apparatus according to the present embodiment judges whether the state in which the specified position is close to the object for calibration continues for a predetermined period of time (S206).

If it is not judged in step S206 to be continued for a predetermined period of time, the information processing apparatus according to the present embodiment repeats the process in step S202 and the subsequent steps.

If it is judged in step S206 to be continued for a predetermined period of time, the information processing apparatus according to the present embodiment determines the offset amount (S208). The information processing apparatus according to the present embodiment determines the offset amount, for example by performing the offset amount determination process according to the first example shown in the above item (3-1) or the offset amount determination process according to the second example shown in the above item (3-2) and by calculating the offset amount.

The information processing apparatus according to the present embodiment determines the offset amount, for example by performing the process shown in FIG. 8 as the offset amount determination process according to the present embodiment.

The offset amount determination process according to the present embodiment is not limited to the example shown in FIG. 8. As one example, the information processing apparatus according to the present embodiment may be configured not to perform the process in steps S200 to S208 of FIG. 8 (or process in steps S202 to S208 when the object for calibration is an object that is shared with other processes including the login button as shown in FIG. 9) based on the recognition result of the operator recognized by biometrics.

(Information Processing Apparatus According to Present Embodiment)

An exemplary configuration of the information processing apparatus according to the present embodiment capable of performing the process for implementing the information processing method according to the present embodiment described above will be described.

Figure 10:
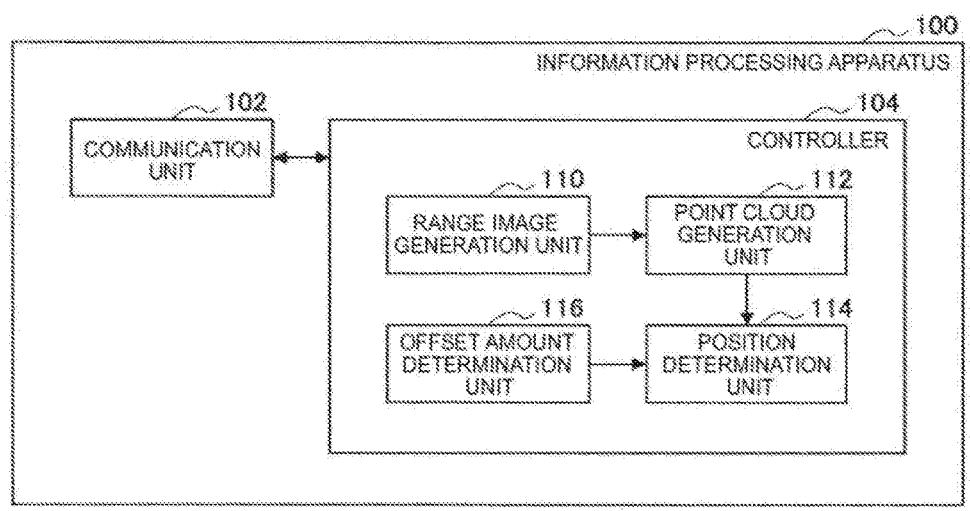
FIG. 10 is a block diagram illustrating an exemplary configuration of an information processing apparatus according to an embodiment of the present disclosure.

FIG. 10 is a block diagram illustrating an exemplary configuration of an information processing apparatus 100 according to the present embodiment. The information processing apparatus 100 is configured to include a communication unit 102 and a controller 104, as one example.

The information processing apparatus 100 may be configured to include a read-only memory (ROM, not shown), a random access memory (RAM, not shown), a storage unit (not shown), an operation unit (not shown) operable by a user, a display unit (not shown) for displaying various pictures on a display screen, and so on. In the information processing apparatus 100, the components described above are interconnected via a bus that serves as a data transmission channel.

The ROM (not shown) is used to store data for control such as programs and operation parameters used by the controller 104. The RAM (not shown) is used to temporarily store programs or the like for execution by the controller 104.

The storage unit (not shown) is a storage means provided in the information processing apparatus 100, and stores data for implementing the information processing method according to the present embodiment, such as data indicating the offset amount, and various data such as applications. Examples of the storage unit (not shown) include a magnetic recording medium such as hard disk, and nonvolatile memory such as flash memory. The storage unit (not shown) may be removable from the information processing apparatus 100.

Examples of the operation unit (not shown) include an operation input device, which will be described later. Examples of the display unit (not shown) include a display device, which will be described later. The display screen as a target to be operated according to the present embodiment may be a display screen of the display unit (not shown) or may be a display screen of an external display device of the information processing apparatus 100.

[Exemplary Hardware Configuration of Information Processing Apparatus 100]

Figure 11:
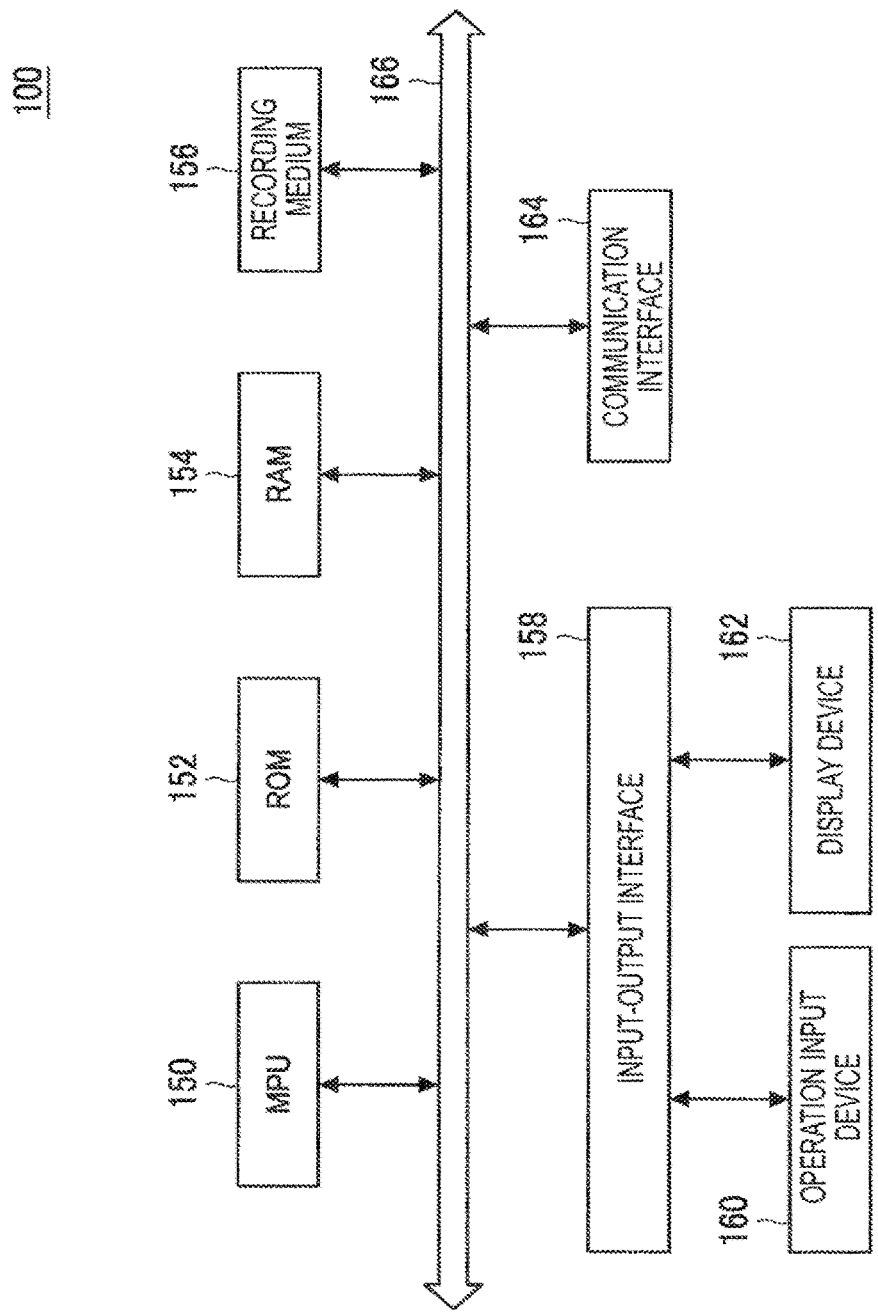
FIG. 11 is a diagram illustrated to describe an exemplary hardware configuration of an information processing apparatus according to an embodiment of the present disclosure.

FIG. 11 is a diagram illustrated to describe an exemplary hardware configuration of the information processing apparatus 100 according to the present embodiment. The information processing apparatus 100 is configured to include an MPU 150, a ROM 152, a RAM 154, a recording medium 156, an input-output interface 158, an operation input device 160, a display device 162, and a communication interface 164, as one example. In the information processing apparatus 100, the components are interconnected via a bus 166 that serves as a data transmission channel.

The MPU 150 may be configured to include a processor constituted by an arithmetic logic circuit such as micro processing unit (MPU) and various processing circuits, and functions as the controller 104 that controls the entire information processing apparatus 100. The MPU 150 serves as a range image generation unit 110, a point cloud generation unit 112, a position determination unit 114, and an offset amount determination unit 116, which will be described later, as one example.

The ROM 152 stores data for control such as programs and operation parameters used by the MPU 150. The RAM 154 stores temporarily programs or the like executed by the MPU 150.

The recording medium 156 functions as the storage unit (not shown), and stores data for implementing the information processing method according to the present embodiment, such as data indicating the offset amount, and various data such as applications. Examples of the recording medium 156 include a magnetic recording medium such as hard disk, and nonvolatile memory such as flash memory. The recording medium 156 may be removable from the information processing apparatus 100.

The input-output interface 158 is used for connection of the operation input device 160 and the display device 162. The operation input device 160 functions as the operation unit (not shown). The display device 162 functions as the display unit (not shown). Examples of the input-output interface 158 include a universal serial bus (USB) terminal, a digital visual interface (DVI) terminal, a high-definition multimedia interface (HDMI, registered trademark) terminal, and various types of processing circuits.

The operation input device 160 is provided, for example, on the information processing apparatus 100 and is connected to the input-output interface 158 within the information processing apparatus 100. Examples of the operation input device 160 include a button, a direction key, a rotation type selector such as a jog dial, and a combination thereof.

The display device 162 is provided, for example, on the information processing apparatus 100 and is connected to the input-output interface 158 within the information processing apparatus 100. Examples of the display device 162 include a liquid crystal display (LCD) and an organic electro-luminescence (EL) display (or also referred to as an organic light emitting diode (OLED) display).

It will be understood that the input-output interface 158 may be connected to an external device, such as an external operation input device (e.g., keyboard or mouse) or an external display device, as an external apparatus of the information processing apparatus 100. The display device 162 may be a device such as a touch panel on which a display process and a user's operation can be performed.

The communication interface 164 is a communication means that is provided in the information processing apparatus 100. The communication interface 164 functions as a communication unit 102 used to communicate with an external device or an external apparatus such as an external range image sensor, an external imaging device, an external display device, or the like by wire or wireless over a network (or directly). Examples of the communication interface 164 include a communication antenna and radio frequency (RF) circuit (wireless communication), an IEEE 802.15.1 port and transmission-reception circuit (wireless communication), an IEEE 802.11 port and transmission-reception circuit (wireless communication), or a local area network (LAN) terminal and transmission-reception circuit (wired communication). Examples of the network according to the present embodiment include a wired network such as LAN or wide area network (WAN), a wireless network such as wireless local area network (WLAN) or wireless wide area network (WWAN) via a base station, and the Internet using a communication protocol such as transmission control protocol/Internet protocol (TCP/IP).

The information processing apparatus 100 having the configuration shown in FIG. 11 as an example performs the process for implementing the information processing method according to the present embodiment. The hardware configuration of the information processing apparatus 100 according to the present embodiment is not limited to the configuration shown in FIG. 11.

As one example, the information processing apparatus 100 may be configured to further include a range image sensor such as a passive depth sensor or an active depth sensor. The information processing apparatus 100 configured to further include a range image sensor is capable of processing a range image generated by the range image sensor.

The information processing apparatus 100 may be configured to further include an imaging device used to generate a stereoscopic image, as one example. Examples of the imaging device according to the present embodiment include a lens/image sensor unit and a signal processing circuit. The lens/image sensor unit is configured to include an optical lens and an image sensor which using a plurality of image sensors such as complementary metal oxide semiconductor (CMOS). The signal processing circuit includes an automatic gain control (AGC) circuit or an analog-to-digital converter (ADC) and converts an analog signal generated by the image sensor into a digital signal (image data), as one example. The signal processing circuit may perform various signal processing including white balance correction processing, color correction processing, gamma correction processing, YCbCr conversion processing, and edge enhancement processing.

The information processing apparatus 100 may be configured not to include the communication interface 164 when the information processing apparatus 100 can communicate with an external apparatus via an external communication device connected thereto. The information processing apparatus 100 may be configured not to include the recording medium 156, the operation input device 160, or the display device 162.

Referring again to FIG. 10, an exemplary configuration of the information processing apparatus 100 will be described. The communication unit 102 is a communication means provided in the information processing apparatus 100 and communicates with an external device or an external apparatus such as an external range image sensor by wire or wireless over a network (or directly). The controller 104 controls a communication performed by the communication unit 102, as one example.

Examples of the communication unit 102 include a communication antenna and RF circuit or a LAN terminal and transmission-reception circuit, but the configuration of the communication unit 102 is not limited thereto. As one example, the communication unit 102 may have a configuration that supports any standard capable of performing communication such as a USB terminal and transmission-reception circuit or any configuration capable of communicating with an external apparatus over a network.

The controller 104 is configured to include an MPU or the like and serves to control the entire information processing apparatus 100. The controller 104 is configured to include the range image generation unit 110, the point cloud generation unit 112, the position determination unit 114, and the offset amount determination unit 116, as one example. The controller 104 plays a leading role in performing the process for implementing the information processing method according to the present embodiment. The controller 104 may be configured to further include a communication controller (not shown) used to control communication in the communication unit 102, as one example.

The range image generation unit 110 generates a range image from a stereoscopic image generated by performing the image capturing in the direction opposite to a display screen from the display screen side. The range image generation unit 110 generates the range image by performing a process for any technique capable of generating a range image from a stereoscopic image, such as a method using the principle of triangulation, as one example.

The range image generation unit 110 processes the stereoscopic image that is transmitted from an external imaging device and is received through the communication unit 102. The external imaging device is arranged so that the image capturing may be performed in the direction opposite to the display screen from the display screen side. When the information processing apparatus 100 is provided with an imaging unit (not shown) including an imaging device arranged to perform the image capturing in the direction opposite to the display screen from the display screen side, the range image generation unit 110 processes the stereoscopic image generated by the image capturing in the imaging unit (not shown).

The point cloud generation unit 112 plays a leading role in performing the process of the above item (1) (point cloud generation process) and generates a point cloud from the range image. The point cloud generation unit 112 may further perform the process shown in the portions B and C of FIG. 11.

When the range image is generated in the range image generation unit 110, the point cloud generation unit 112 generates the point cloud from the range image transferred from the range image generation unit 110, as one example. When the communication unit 102 receives the range image transmitted from an external range image sensor, the point cloud generation unit 112 generates the point cloud from the range image received through the communication unit 102.

The position determination unit 114 plays a leading role in performing the process of the above item (2) (specified position determination process). The position determination unit 114 performs the principal component analysis on the point cloud generated in the point cloud generation unit 112, detects a vector corresponding to an object relating to position specification based on the analysis result, and determines a specified position that is specified on the display screen. The position determination unit 114 determines the specified position, for example by performing the process in steps S106 to S112 or the process shown in the portions D to I of FIG. 11.

The offset amount determination unit 116 plays a leading role in performing the process of the above item (3) (offset amount determination process) and determines the offset amount. The offset amount determination unit 116 performs the offset amount determination process according to the first example shown in the above item (3-1), the offset amount determination process according to the second example shown in the above item (3-2), or the like.

When the offset amount is determined in the offset amount determination unit 116, the position determination unit 114 adjusts the specified position by the determined offset amount and then determines the specified position.

The controller 104, which is configured to include the range image generation unit 110, the point cloud generation unit 112, the position determination unit 114, and the offset amount determination unit 116, plays a leading role in performing the process for implementing the information processing method according to the present embodiment.

The information processing apparatus 100, which has the configuration shown in FIG. 10 as an example, performs the process for implementing the information processing method according to the present embodiment (e.g., the processes in the above items (1) (point cloud generation process) to (3) (offset amount determination process)).

Thus, the information processing apparatus 100, which has the configuration shown in FIG. 10 as an example, is capable of determining the specified position on the display screen based on the range image.

The information processing apparatus 100, which has the configuration shown in FIG. 10 as an example, can achieve the effects achieved by performing the process for implementing the information processing method according to the present embodiment as described above.

The configuration of the information processing apparatus according to the present embodiment is not limited to the configuration shown in FIG. 10.

As one example, when the information processing apparatus according to the present embodiment has the configuration capable of processing the range image generated in an external range image sensor, the information processing apparatus may be configured not to include the range image generation unit 110 shown in FIG. 10. As one example, it is also possible for the information processing apparatus according to the present embodiment to be configured not to include the offset amount determination unit 116 shown in FIG. 10.

Even when the information processing apparatus according to the present embodiment has a configuration without one or both of the range image generation unit 110 and the offset amount determination unit 116 shown in FIG. 10, the information processing apparatus is capable of performing the process of the above item (1) (point cloud generation process) and the process of the above item (2) (specified position determination process). Thus, even when the information processing apparatus according to the present embodiment has the configuration as described above, the information processing apparatus is capable of determining the specified position on the display screen based on the range image.

In the information processing apparatus according to the present embodiment, one or more of the range image generation unit 110, the point cloud generation unit 112, the position determination unit 114, and the offset amount determination unit 116 shown in FIG. 10 can be configured as separate components (e.g., separate processing circuits) from the controller 104.

The information processing apparatus according to the present embodiment may be configured to further include a detection unit (not shown) used to generate the range image or the stereoscopic image generated by performing the image capturing in the direction opposite to the display screen from the display screen side, according to the present embodiment. The detection unit (not shown) includes the range image sensor used to generate the range image or the imaging device used to generate the stereoscopic image generated by performing the image capturing in the direction opposite to the display screen from the display screen side, according to the present embodiment, as one example.

When the detection unit (not shown) is provided, the point cloud generation unit 112 processes the range image generated by the detection unit (not shown) or the range image generated by the range image generation unit 110 based on the stereoscopic image generated by the detection unit (not shown).

In the information processing apparatus according to the present embodiment, when communication with an external device or external apparatus such as an external range image sensor is performed via an external communication device having a similar function and structure to the communication unit 102, the information processing apparatus may be configured not to include the communication unit 102.

In the above, the information processing apparatus has been described as the present embodiment, but embodiments of the present disclosure are not limited thereto. The present embodiment is applicable to various types of equipment including a computer such as personal computer (PC) and server, an apparatus having range image sensor, a display apparatus, a television set, a communication apparatus such as mobile phone or smartphone, a tablet apparatus, a video/music reproduction apparatus (or video/music recording and reproduction apparatus), and a game console. The present embodiment is also applicable to, for example, a processing integrated circuit (IC) that can be incorporated into equipment as described above.

The present embodiment may be implemented by a system including a plurality of devices connected to a network (or communication among devices) like cloud computing. In other words, the information processing apparatus according to the present embodiment described above can be implemented as an information processing system including a plurality of devices, as one example.

(Program According to Present Embodiment)

A program for causing a computer to function as the information processing apparatus according to the present embodiment (e.g., program capable of executing the process of implementing the information processing method according to the present embodiment, including "the process of the above item (1) (point cloud generation process) and the process of the above item (2) (specified position determination process)", or "processes in the above items (1) (point cloud generation process) to (3) (offset amount determination process)") is executed by a processor or the like in the computer, and thus it is possible determine the specified position on the display screen based on the range image.

The execution of a program for causing a computer to function as the information processing apparatus according to the present embodiment by a processor or the like in the computer allows the effects achieved by performing the process for implementing the information processing method according to the present embodiment as described above to be achieved.

It should be understood by those skilled in the art that various modifications, combinations, sub-combinations and alterations may occur depending on design requirements and other factors insofar as they are within the scope of the appended claims or the equivalents thereof.

For example, the program (computer program) causing the computer to function as the information processing apparatus according to the embodiment has been provided above. However, the embodiment can also provide a recording medium storing the foregoing program.

The above-described configuration is an example of the embodiment and, of course, pertains to the technical scope of an embodiment of the present disclosure. In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An information processing apparatus including:
a point cloud generation unit configured to generate a point cloud from a range image representing a range equivalent to a distance from a display screen to an object; and
a position determination unit configured to perform a principal component analysis on the generated point cloud, to detect a vector corresponding to an object relating to position specification based on an analysis result obtained by the analysis, and to determine a specified position, the specified position being specified on the display screen.

(2) The information processing apparatus according to (1),
wherein the position determination unit selectively calculates an intersection point between the display screen and a vector of a first principal component that is the vector corresponding to the object relating to position specification and determines the calculated intersection point as the specified position, the selective calculation of the intersection point being performed based on a comparison result obtained by comparing a principal component score of the first principal component with a principal component score of a second principal component obtained by performing the principal component analysis.

(3) The information processing apparatus according to (1) or (2),
wherein the position determination unit extracts a point group that contains a point closest to the display screen from the point cloud and performs the principal component analysis on the extracted point group.

(4) The information processing apparatus according to (3),
wherein the point determination unit extracts a point group included within a sphere having a predetermined radius around the point closest to the display screen.

(5) The information processing apparatus according to (4),
wherein the point determination unit
divides the extracted point group into a plurality of point groups by segmentation, and
performs the principal component analysis on a point group having a largest number of points from among the divided point groups.

(6) The information processing apparatus according to (5),
wherein, when the point group having the largest number of points is a point group that contains a point adjacent to a point contained in a point group corresponding to the object relating to position specification, the position determination unit prevents the principal component analysis from being performed on the point group having the largest number of points, and excludes the point group having the largest number of points from a target to be processed.

(7) The information processing apparatus according to any one of (3) to (6),
wherein,
when the principal component analysis is performed, the position determination unit judges whether a number of times that the principal component analysis is performed on the point cloud satisfies a condition relating to a predetermined number of times, and
when the condition relating to the predetermined number of times is not judged to be satisfied, the position determination unit excludes a point group subjected to the principal component analysis from a target to be processed, again extracts a point group that contains a point closest to the display screen from the point cloud, and performs the principal component analysis on the extracted point group.

(8) The information processing apparatus according to any one of (1) to (7), further including:
an offset amount determination unit configured to determine an offset amount used to adjust the specified position,
wherein, when the offset amount is determined, the position determination unit adjusts the specified position by the determined offset amount and then determines the specified position.

(9) The information processing apparatus according to (8),
wherein the offset amount determination unit determines the offset amount based on a predetermined position on the display screen and the determined specified position.

(10) The information processing apparatus according to (8),
wherein the offset amount determination unit determines the offset amount based on a difference between a vector of a first principal component obtained by performing the principal component analysis and a vector in a direction from a predetermined position corresponding to the object relating to position specification to a predetermined position on the display screen, the vector of a first principal component being the vector corresponding to the object relating to position specification.

(11) The information processing apparatus according to any one of (8) to (10),
wherein the offset amount determination unit determines the offset amount selectively for each operator based on a recognition result obtained by recognizing the operator.

(12) The information processing apparatus according to any one of (1) to (11), further including:
a range image generation unit configured to generate the range image from a stereoscopic image generated by performing image capturing in a direction opposite to the display screen from a side of the display screen,
wherein the point cloud generation unit generates the point cloud from the range image generated from the stereoscopic image.

(13) The information processing apparatus according to any one of (1) to (12),
wherein the point cloud generation unit generates the point cloud in a real scale.

(14) An information processing method executed by an information processing apparatus, the information processing method including:
a step of generating a point cloud from a range image representing a range equivalent to a distance from a display screen to an object; and
a step of performing a principal component analysis on the generated point cloud, detecting a vector corresponding to an object relating to position specification based on an analysis result obtained by the analysis, and determining a specified position, the specified position being specified on the display screen.

(15) A program for causing a computer to execute:
a step of generating a point cloud from a range image representing a range equivalent to a distance from a display screen to an object; and
a step of performing a principal component analysis on the generated point cloud, detecting a vector corresponding to an object relating to position specification based on an analysis result obtained by the analysis, and determining a specified position, the specified position being specified on the display screen.

REFERENCE SIGNS LIST 10 display device
12, 12A, 12B range image sensor (or imaging device)
100 information processing apparatus
102 communication unit
104 controller
110 range image generation unit
112 point cloud generation unit
114 position determination unit
116 offset amount determination unit

The invention claimed is:
1. An information processing apparatus, comprising:
circuitry configured to:
generate a point cloud from a range image that indicates a distance from a display device to an object, wherein the point cloud comprises a group of points representing a surface of the object;
extract from the group of points, a first point group comprising a first point that is closest to the display device among the group of points;
determine an analysis result based on principal component analysis on the first point group, wherein the analysis result comprises a first principal component and a second principal component;
determine a first vector of the first principal component, based on the analysis result, wherein the first vector corresponds to position information of the object; and
determine a first position of the object based on the first vector, wherein the first position is on the display device.
2. The information processing apparatus according to claim 1, wherein the circuitry is further configured to:
compare a first score of the first principal component with a second score of the second principal component; and
calculate the first position as an intersection point between the display device and the first vector based on the comparison.
3. The information processing apparatus according to claim 1, wherein the first point group is within a sphere centered at the first point.
4. The information processing apparatus according to claim 1,
wherein the circuitry is further configured to:
divide the first point group into a plurality of point groups based on segmentation of the first point group, and
determine the analysis result based on the principal component analysis on a second point group having a largest number of points from among the plurality of point groups.

5. The information processing apparatus according to claim 4,
wherein the circuitry is further configured to:
prevent the principal component analysis on the second point group, based on the second point group that comprises a second point adjacent to the first point; and
exclude the second point group from a target subjected to the principal component analysis.
6. The information processing apparatus according to claim 4, wherein the circuitry is further configured to:
determine a number of times of the principal component analysis on the second point group;
exclude the second point group from a target subjected to principal component analysis, based on the number of times of the principal component analysis on the second point group does not satisfy a condition associated with a threshold number of times;
extract a third point group from the group of points, wherein the third point group comprises a second point that is closest to the display device among the group of points; and
determine the analysis result based on the principal component analysis on the third point group.
7. The information processing apparatus according to claim 1, wherein the circuitry is further configured to:
determine an offset amount to adjust the first position; and
adjust the first position based on the offset amount.
8. The information processing apparatus according to claim 7, wherein the circuitry is further configured to determine the offset amount based on a threshold position on the display device and the first position.
9. The information processing apparatus according to claim 7,
wherein the circuitry is further configured to determine the offset amount based on a difference between the first vector and a second vector, and
wherein the second vector is in a direction from the first position to a second position on the display device.
10. The information processing apparatus according to claim 7, wherein the circuitry is further configured to:
recognize each of a plurality of operators of the information processing apparatus; and
determine the offset amount selectively for each of the plurality of operators, based on the recognition.
11. The information processing apparatus according to claim 1, wherein the circuitry is further configured to:
capture a stereoscopic image of a region in a display direction of the display device; and
generate the range image from the stereoscopic image.
12. The information processing apparatus according to claim 1, wherein the circuitry is further configured to generate the point cloud in a real scale.
13. An information processing method, comprising:
generating a point cloud from a range image that indicates a distance from a display device to an object, wherein the point cloud comprises a group of points representing a surface of the object;
extracting from the group of points, a first point group comprising a first point that is closest to the display device among the group of points;
determining an analysis result based on principal component analysis on the first point group, wherein the analysis result comprises a principal component;
determining a vector of the principal component, based on the analysis result, wherein the vector corresponds to position information of the object; and
determining a position of the object based on the vector, wherein the position is on the display device.

14. A non-transitory computer-readable medium having stored thereon, computer-executable instructions for causing a computer to execute operations, the operations comprising:
- generating a point cloud from a range image that indicates a distance from a display device to an object, wherein the point cloud comprises a group of points representing a surface of the object;
- extracting from the group of points, a first point group comprising a first point that is closest to the display device among the group of points;
- determining an analysis result based on principal component analysis on the first point group, wherein the analysis result comprises a principal component;
- determining a vector of the principal component, based on the analysis result, wherein the vector corresponds to position information of the object; and
- determining a position of the object based on the vector, wherein the position is on the display device.

* * * * *